United States Patent
Moghbeli

(10) Patent No.: US 10,577,697 B2
(45) Date of Patent: Mar. 3, 2020

(54) HIGH EFFICIENCY CAST IRON ANODE

(71) Applicant: Omidreza Moghbeli, Rancho Cucamonga, CA (US)

(72) Inventor: Omidreza Moghbeli, Rancho Cucamonga, CA (US)

( * ) Notice: Subject to any disclaimer, the term of this patent is extended or adjusted under 35 U.S.C. 154(b) by 191 days.

(21) Appl. No.: 15/693,282

(22) Filed: Aug. 31, 2017

(65) Prior Publication Data

US 2018/0066369 A1 Mar. 8, 2018

Related U.S. Application Data

(60) Provisional application No. 62/383,148, filed on Sep. 2, 2016.

(51) Int. Cl.
*H01M 10/44* (2006.01)
*C23F 13/16* (2006.01)
*F16L 58/00* (2006.01)

(52) U.S. Cl.
CPC .............. *C23F 13/16* (2013.01); *F16L 58/00* (2013.01); *C23F 2213/32* (2013.01)

(58) Field of Classification Search
CPC ........ H01M 2/0235; H01M 4/75; H01M 4/78; C23F 13/16; C23F 2213/32; F16L 58/00
See application file for complete search history.

(56) References Cited

U.S. PATENT DOCUMENTS

| 320,232 | A | * | 6/1885 | Du Shane | ........... | H01M 2/0275 |
| | | | | | | 429/164 |
| 4,823,072 | A | * | 4/1989 | Walcott | ................... | C23F 13/04 |
| | | | | | | 204/196.05 |
| 2009/0169994 | A1 | * | 7/2009 | Mah | ....................... | H01M 4/364 |
| | | | | | | 429/218.1 |

FOREIGN PATENT DOCUMENTS

CN 103146989 A * 6/2013

OTHER PUBLICATIONS

Machine translation for Guo et al., CN 103146989 A. (Year: 2019).*
Anotek Product Bulletin, May 16, 2013.
Farwest Corrosion Control product description.

* cited by examiner

*Primary Examiner* — Raymond Alejandro
(74) *Attorney, Agent, or Firm* — Kenneth L. Green; Averill & Green

(57) ABSTRACT

An enhanced anode includes a modulated body which improves anode current output efficiency by maximizing the surface area to increase surface area to weight ratio. A toroidally modulated embodiment of the enhanced anode enlarges surface area by 48 percent increasing current output efficiency by 48 percent, only increases weight by three percent, and improves surface/weight ratio 44 percent, compared to know cylindrical anodes. The enhanced anode is preferably made from cast iron or other suitable materials (e.g. magnesium, zinc, aluminum) as well, and the design of the improved anode is applicable to galvanic cast anodes in general. The enhanced anode is suitable for molding and casting and does not increase production costs.

17 Claims, 3 Drawing Sheets

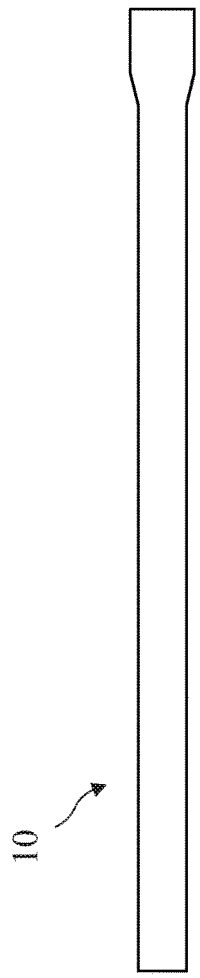
FIG. 1 (prior art)
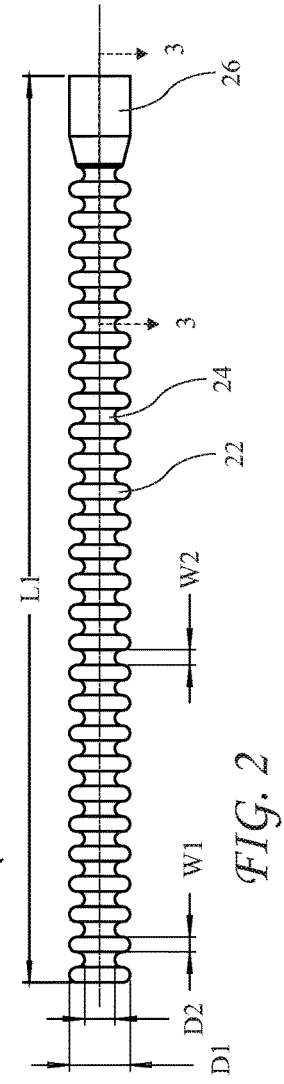
FIG. 2
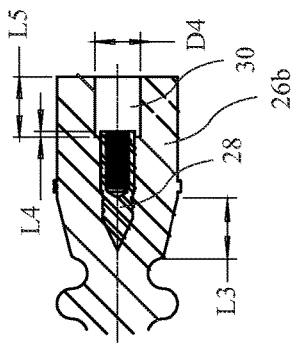
FIG. 3
FIG. 4
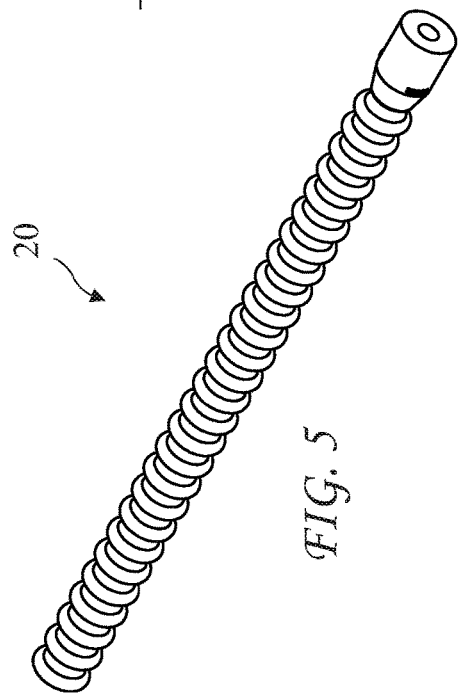
FIG. 5

HIGH EFFICIENCY CAST IRON ANODE

CROSS-REFERENCE TO RELATED APPLICATIONS

The present application claims the priority of U.S. Provisional Patent Application Ser. No. 62/383,148 filed Sep. 2, 2016, which application is incorporated in its entirety herein by reference.

BACKGROUND OF THE INVENTION

The present invention generally relates to anodes being utilized in cathodic protection system of underground or submerged pipelines, reservoirs and structures.

Internal and external, underground and submerged metallic surfaces of pipelines, reservoirs and other structures are subject to corrosion due to electrochemical reactions between the metallic surfaces and the corrosive medium they are in contact with. Cathodic protection systems are installed in pipelines, reservoirs and other structures to limit the amount of corrosion occurring on the subjected surfaces. Pipeline operators and Tank & facility owners use either impressed current and/or galvanic cathodic protection systems that both imply a series of anodes in order to mitigate and control the severity of corrosion attacks.

Known anode materials used in cathodic protection systems are high silicon cast iron, magnesium, zinc, and aluminum alloys. These anodes are produced using casting techniques in different sizes and shapes depending on application and are commonly produced in the shape of simple rod, tube, and rectangular cube using sand molded casting or metal die casting techniques.

Current output capacity or efficiency of each cathodic protection anode in a specific medium is limited by the surface area of anode which is in contact with the medium. On the other hand, the weight of anode is a very important factor in casting industry from a cost-efficiency point of view. Increasing the anode weight to achieve larger surface area would dramatically increase casting, handling, shipping and installation costs.

BRIEF SUMMARY OF THE INVENTION

The present invention addresses the above and other needs by providing an enhanced anode includes a modulated body which improves anode current output efficiency by maximizing the surface area to increase surface area to weight ratio. A toroidally modulated embodiment of the enhanced anode enlarges surface area by 48 percent increasing current output efficiency by 48 percent, only increases weight by three percent, and improves surface/weight ratio 44 percent, compared to know cylindrical anodes. The enhanced anode is preferably made from cast iron or other suitable materials (e.g. magnesium, zinc, aluminum) as well, and the design of the improved anode is applicable to galvanic cast anodes in general. The enhanced anode is suitable for molding and casting and does not increase production costs.

In accordance with one aspect of the invention, there is provided an enhanced anode having a modulated body. Known anodes are simple cylindrical shapes. The modulated body of the enhanced anode increases the ratio of surface to weight, thereby increasing efficiency. As a result, the enhanced anode provides about twice the current output of known anodes, reducing the number of anodes required by about 50 percent. Such reduction is significant saving both the cost of the anodes and installation costs. In one embodiment, the modulated body is a sequence of toroidal shaped convex circles.

In accordance with another aspect of the invention, there is provided an enhanced anode having an improved surface to weight ratio. The enhanced anode has a surface area of about 0.58 square meters and a weight of about 67 kilograms, resulting in a surface to weight ratio of about 0.00864 square meters per kilogram. Known anodes have a surface to weight ratio of about 0.006 square meters per kilogram. Therefore, the enhanced anode has increased the surface to weight ratio by 44 percent.

In accordance with yet another aspect of the invention, there is provided an anode for corrosion/cathodic protection systems, including a rectifier receiving an alternating current and producing direct current, buried metal pipes electrically connected to a negative terminal of the rectifier to receive a flow of direct current, at least one anode buried proximal to the buried metal pipes and electrically connected to a positive terminal of the rectifier to receive a flow of the direct current. The anode comprises an elongated body made from silicon iron material, sequentially longitudinally spaced apart toroidally shaped modulations formed on the body, concave troughs residing between each consecutive pair of the modulations, smooth transitions between the consecutive modulations and the troughs, and an electrical connection at, at least one end of the body for electrically connecting to the rectifier.

In accordance with still another aspect of the invention, there is provided an enhanced anode having modulation and troughs with rounded surfaces and smooth transitions with no cusps. Such shaped anode is easier to cast reducing manufacturing cost.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a prior art anode.

FIG. 2 shows a side view of an enhanced anode according to the present invention.

FIG. 3 shows a cross-sectional view of a head of the enhanced anode according to the present invention taken along line 3-3 of FIG. 2.

FIG. 4 shows a more detailed cross-sectional view of the head of the enhanced anode according to the present invention taken along line 3-3 of FIG. 2.

FIG. 5 shows an isometric view of the enhanced anode according to the present invention.

Corresponding reference characters indicate corresponding components throughout the several views of the drawings.

DETAILED DESCRIPTION OF THE INVENTION

Figure 6:
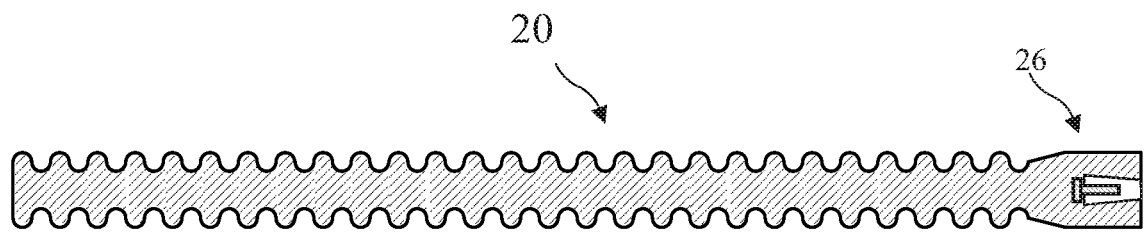
FIG. 6 shows a cross-sectional side view of the enhanced anode according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

A prior art anode 10 is shown in FIG. 1. The prior art anode 10 is a plain cylinder with uniform cross-section over the length of the body.

A side view of an enhanced anode 20 according to the present invention is shown in FIG. 2 and an isometric view of the enhanced anode 20 is shown in FIG. 5. The anode 20 has sequentially spaced apart modulations 22 separated by troughs 24, and a head 26. The modulations are preferably toroid shaped convex rings and the troughs are rounded concave rings. The anode 20 has a length L1, a major diameter D1 and width W1 and radius R1 of the modulations 22, a minor diameter D2 and a width W2 and radius R2 of the troughs 24. The length L1 is preferably about 60 inches, the diameter D1 is preferably about four inches and the diameter D2 is preferably about two inches. The width W1 is preferably about one inch, the radius R1 is preferably about ½ inches, the width W2 is preferably about one inch, and the radius R2 is preferably about ½ inches. The modulations 22 and troughs 24 define a smooth transition, preferably with no step or cusp. While the embodiment described above describes a maximum diameter of the modulations as about twice the minimum diameter of troughs, an anode have the maximum diameter of the modulations at least 1.5 times the minimum diameter of troughs is intended to come within the scope of the present invention.

A cross-sectional view of the head 26 of the enhanced anode 20 taken along line 3-3 of FIG. 2 is shown in FIG. 3 and a more detailed cross-sectional view of the head 26 of the enhanced anode 20 taken along line 3-3 of FIG. 2 is shown in FIG. 4. The head has a conical portion 26a having a length L3 and conical angle A, and a cylindrical portion 26b having a length L2. A pin 28 is embedded in the anode 20 for attachment of an electrical connection. The anchor 28 is recessed in a cavity 30 having a depth L5 and the pin 28 extending into the cavity a length L4. The length L2 is preferably about four inches, the length L3 is preferably about two inches, the length L4 is preferably about 0.2 inches, the length L5 is preferably about two inches, and angle A is preferably about 28 degrees.

Figure 7:
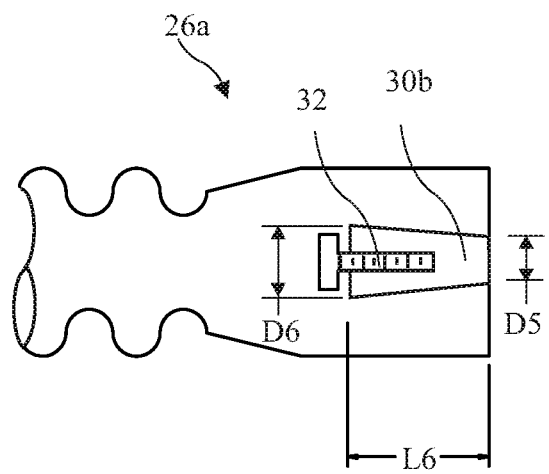
FIG. 7 shows a cross-sectional view of a second embodiment of the head of the enhanced anode according to the present invention.
Figure 8:
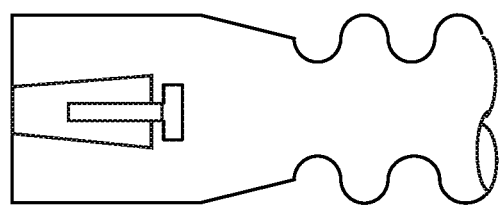
FIG. 8 shows a cross-sectional view of a second head of the enhanced anode according to the present invention opposite to a first head.

A cross-sectional side view of the enhanced anode 20 is shown in FIG. 6, a cross-sectional view of a second embodiment of the head 26a of the enhanced anode 20 is shown in FIG. 7, and a cross-sectional view of a second head 26' of the enhanced anode 20, residing at an end of the anode 20 opposite to the first head 26a, is shown in FIG. 8. Anodes can be manufactured with one head on one side or two heads, one each side to ease electrical connections if needed. The second head 26a includes a conical recess 30b having a length L6, an open end diameter D5, and a closed end diameter D6. A bolt 32 is embedded in the anode 20 and includes a threaded portion reaching into the conical recess 30b. The length L6 is preferably about four inches, the diameter D5 is preferably about one inch, and the diameter D6 is preferably about 1.5 inches.

Figure 9:
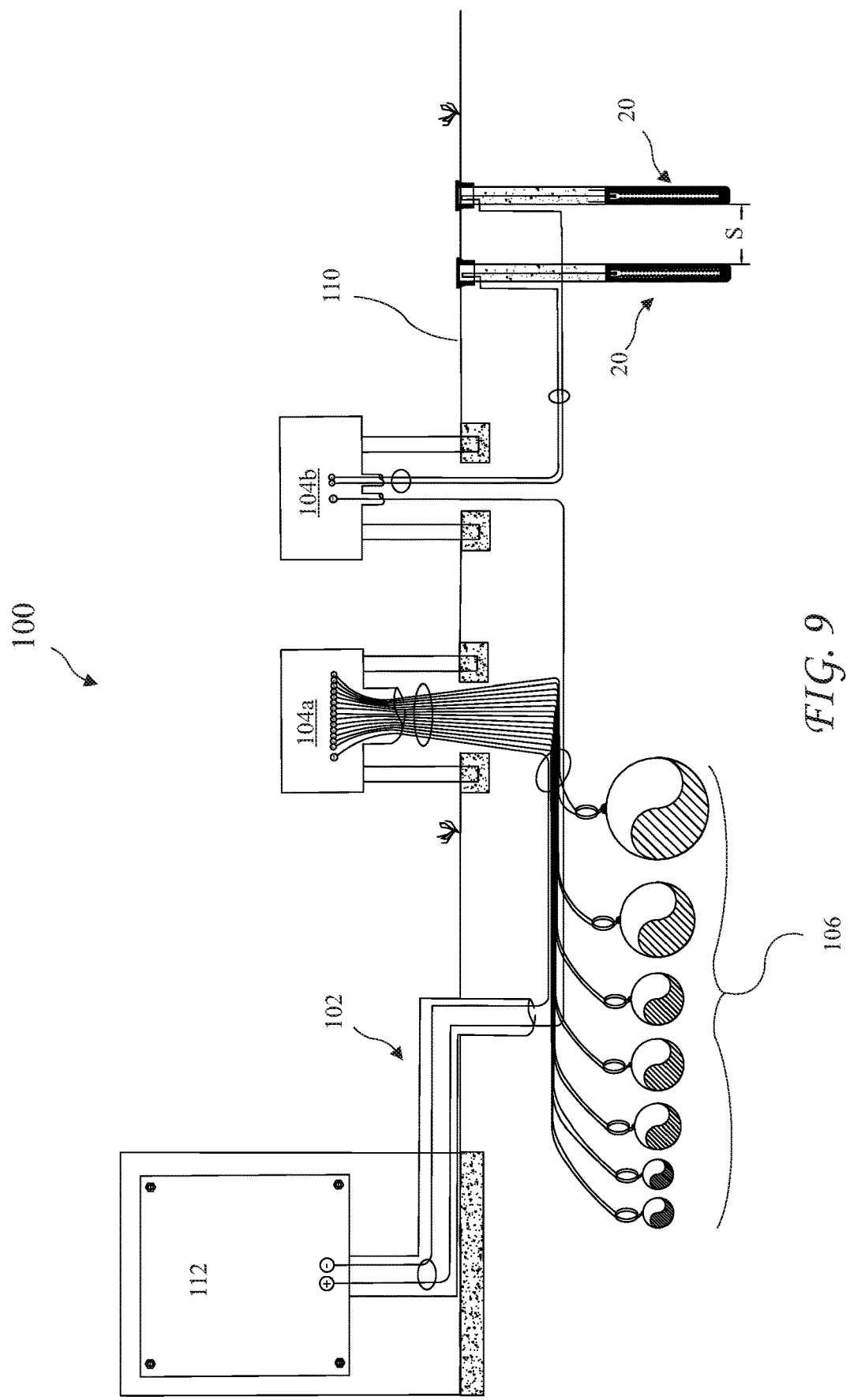
FIG. 9 shows an anode corrosion protection system according to the present invention.

An impressed current anode for corrosion/cathodic protection systems according to the present invention is shown in FIG. 9. A rectified 112 provides negative current to buried metal assets 106 through cables 102 and a negative bond box 104a, and positive current to anodes 20 through cables 102 and a junction box 104b, below ground level 110. The anodes 20 are preferably spaced apart a separation S, of for example, 300 inches. If the anodes are made of sacrificial alloys such as Aluminum, Zinc or magnesium, a rectifier is not required.

The anode 20 may be made from anode materials, for example, iron, magnesium, aluminum, and zinc alloys, and a preferred material is a silicon iron alloy made up of 14.20 to 14.75 percent by weight of silicon, a maximum of 1.5 percent by weight of manganese, 0.7 to 1.1 percent by weight of carbon, 3.25 to 5 percent by weight of chromium, 0.2 maximum percent by weight of molybdenum, 0.5 maximum percent by weight of copper, and the remainder iron.

While the anode 20 is described as having a series of toroid shaped convex rings separated by troughs comprising rounded concave rings to increase the surface to weight (or volume) ratio, those skilled in the art will recognize various shaped anodes which provide this advantage. Such variations include serially spaced apart cylindrical modulations, and various shapes between such cylindrical modulations and the toroidal modulations described above. Any anode including serially spaced apart modulations is intended to come within the scope of the present invention. Further, the anode may include longitudinal flutes to increase surface area, and a fluted anode is intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. An anode, comprising:
    an elongated body made from an anodic material;
    repeated modulations on the elongated body; and
    an electrical connection at, at least one head of the elongated body;
    wherein:
        the repeated modulations are radially symmetric sequentially repeated convex rings rounded in a side view separated by concave troughs rounded in the side view;
        the convex rings are circular arc shaped in a side view;
        the concave troughs are circular arc shaped in a side view; and
        transitions between the convex rings and the concave troughs are smooth transitions.

2. The anode of claim 1, wherein the convex rings have a major diameter (D1) of at least 1.5 times a minor diameter (D2) of the concave troughs.

3. The anode of claim 2, wherein the convex rings have a major diameter of about twice a minor diameter of the concave troughs.

4. The anode of claim 3, wherein transitions between the convex rings and the concave troughs are smooth transitions.

5. The anode of claim 1, wherein the repeated modulations are sequentially repeated cylindrical shapes separated by troughs.

6. The anode of claim 5, wherein the repeated modulations are separated by cylindrical troughs.

7. The anode of claim 1, wherein the modulations on the elongated body are longitudinal fluting.

8. The anode of claim 1, wherein a second electrical connection resides at a second head of the elongated body opposite to the at least one head.

9. The anode of claim 1, wherein the anodic material is selected from the group consisting of iron alloy, magnesium alloy, aluminum alloy, and zinc alloy.

10. The anode of claim 1, wherein the anodic material is a silicon iron.

11. The anode of claim 10, wherein the silicon iron alloy is made up of 14.20 to 14.75 percent by weight of silicon, a maximum of 1.5 percent by weight of manganese, 0.7 to 1.1 percent by weight of carbon, 3.25 to 5 percent by weight of chromium, 0.2 maximum percent by weight of molybdenum, 0.5 maximum percent by weight of copper, and the remainder iron.

12. The anode of claim 1, wherein the elongated body has a surface area to weight ratio about 44 percent higher than a cylindrical shaped body.

13. An anode, comprising:
an elongated body made from silicon iron material;
sequentially longitudinally spaced apart, radially symmetric, convex, rounded, ring shaped modulations formed on the elongated body;
rounded, concave troughs separating consecutive ones of the ring shaped modulations, the ring shaped modulations having a maximum diameter at least 1.5 times a minimum diameter of the rounded, concave troughs;
smooth transitions between the ring shaped modulations and the rounded, concave troughs; and
an electrical connection at, at least one head of the elongated body.

14. The anode of claim 13, wherein a portion of the anode including the ring shaped modulations and concave troughs is solid having no interior voids.

15. The anode of claim 13, wherein an entire portion of the anode including the ring shaped modulations and concave troughs has a smooth, closed exterior surface having no sharp edges.

16. The anode of claim 13, wherein the entire elongated body of the anode is made from silicon iron material.

17. An anode for corrosion/cathodic protection systems, comprising:
a rectifier receiving an alternating current electrical signal and producing a direct current electrical signal;
buried metal pipes electrically connected to a negative terminal of the rectifier to receive a flow of negative direct current;
at least one anode buried proximal to the buried metal pipes and electrically connected to a positive terminal of the rectifier to receive a flow of positive direct current, the anode comprising:
an elongated body made from silicon iron material;
sequentially longitudinally spaced apart rounded, convex ring shaped modulations formed on the elongated body;
rounded concave troughs residing between each consecutive ones of the modulations;
smooth transitions between consecutive ones of the modulations and the rounded concave troughs; and
an electrical connection at, at least one head of the elongated body for electrically connecting to the rectifier.

* * * * *